United States Patent [19]

Vogler

[11] Patent Number: 5,121,317

[45] Date of Patent: Jun. 9, 1992

[54] INVERTER DEVICE

[75] Inventor: Gerd Vogler, Minden, Fed. Rep. of Germany

[73] Assignee: U.S. Philips Corporation, New York, N.Y.

[21] Appl. No.: 566,738

[22] Filed: Aug. 13, 1990

[30] Foreign Application Priority Data

Aug. 24, 1989 [DE] Fed. Rep. of Germany ....... 3927888

[51] Int. Cl.⁵ ............................................ H02M 7/521
[52] U.S. Cl. ...................... 363/96; 363/136; 378/101; 378/107
[58] Field of Search ...................... 363/24, 27, 95, 96, 363/135, 136, 137, 132, 133, 97, 98; 378/101, 105, 106, 107; 315/190, 291, 205, 244, 307, DIG. 7; 307/354

[56] References Cited

U.S. PATENT DOCUMENTS

| 4,514,795 | 4/1985 | von der Zwart . |
| 4,653,082 | 3/1987 | Tsuchiya ............... 378/101 |
| 4,700,281 | 10/1987 | Thorn et al. ............. 363/37 |
| 4,959,558 | 9/1990 | Kay et al. ............... 307/354 |

FOREIGN PATENT DOCUMENTS

| 0107003 | 5/1984 | European Pat. Off. . |
| 0137401 | 4/1985 | European Pat. Off. . |
| 3046413 | 7/1982 | Fed. Rep. of Germany . |
| 3046767 | 7/1982 | Fed. Rep. of Germany . |
| 3218535 | 11/1983 | Fed. Rep. of Germany . |

Primary Examiner—Steven L. Stephan
Assistant Examiner—Emanuel Todd Voeltz
Attorney, Agent, or Firm—William Squire

[57] ABSTRACT

A series resonant circuit and at least two push-pull connected electronic switches are traversed by a respective halfwave of the resonant-circuit current and via which switches the series resonant circuit is coupled to a d.c. source. GTO thyristors form the electronic switches, which thyristors are switched by a pulse generator device which generates a blocking pulse at the zero crossing of the resonant-circuit current and which generates a trigger pulse for the subsequently conductive GTO thyristor a predetermined delay time after activation of the blocking pulse to selectively shape the output current of the inverter to control the resultant power.

12 Claims, 2 Drawing Sheets

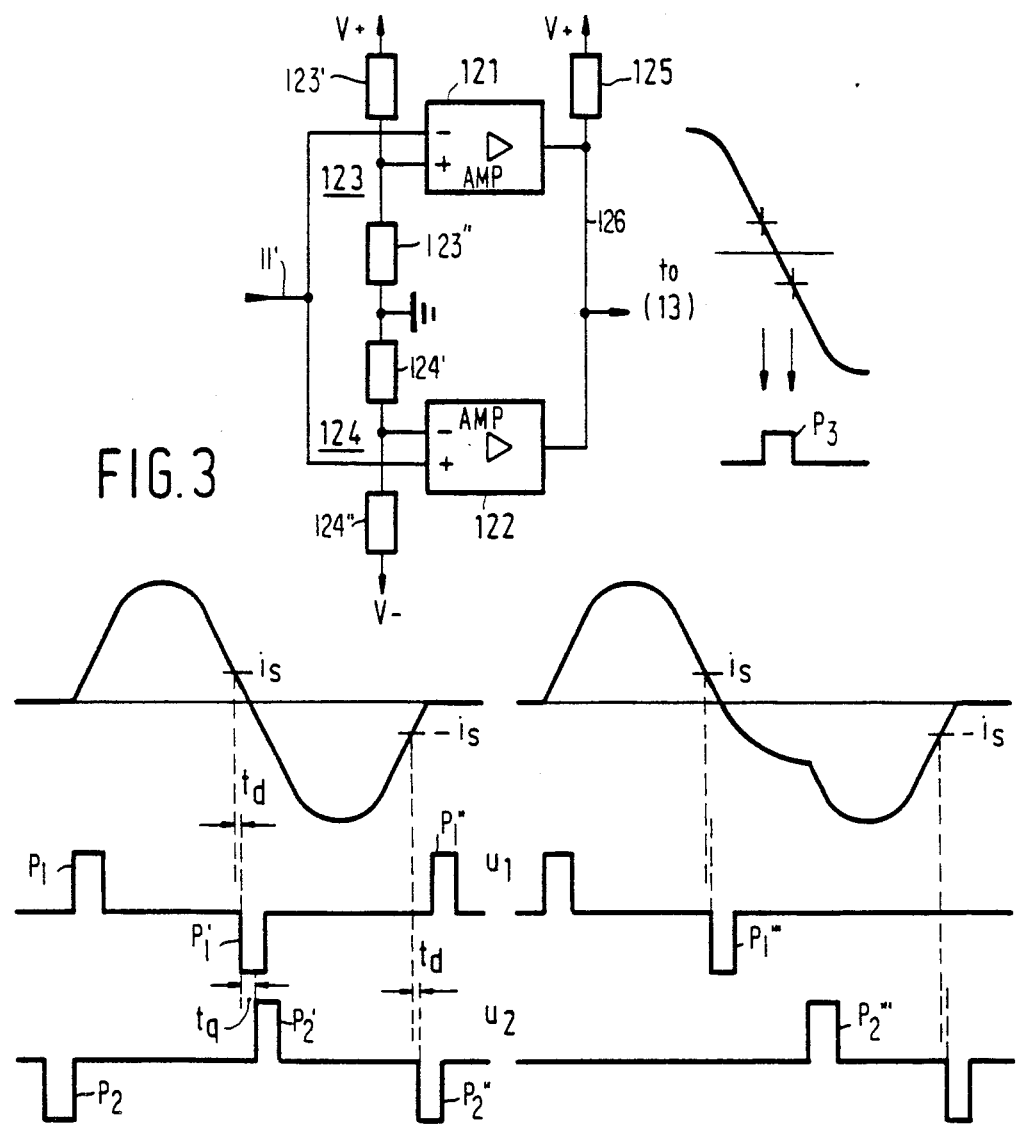
FIG.3
FIG.4a    FIG.4b
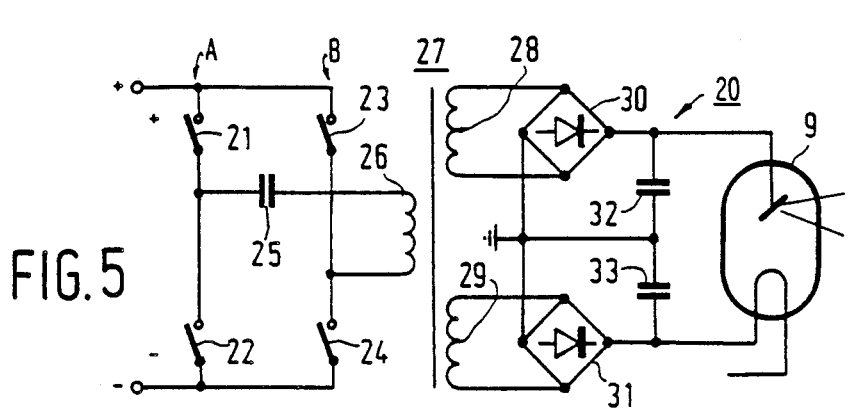
FIG.5

INVERTER DEVICE

BACKGROUND OF THE INVENTION

Field of the Invention

The invention relates to inverter, notably for an X-ray generator, comprising a series resonant circuit and at least two push-pull connected electronic switches which are traversed by a respective halfwave of the resonant-circuit current and via which the series resonant circuit can be coupled to a d.c. source.

Inverters of this kind are known (DE OS 30 46 413; DE-OS 30 46 767 and DE-OS 32 18 535 the latter corresponding to U.S. Pat. No. 4,514,295). The electronic switches thereof are conductive during a respective halfwave and the electric power that can be generated by such an inverter device is greater as the halfwaves traversing the electronic switches in push-pull succeed one another more closely.

In the known inverters the electronic switches are formed by thyristors which are connected to the d.c. source in the forward direction, a diode being connected to each of said thyristors in an anti-parallel configuration. In electronic switches of this kind it is not possible for the halfwaves to flow through the push-pull connected switches in direct succession, as appears from FIG. 1 which shows the variation in time of the resonant-circuit current in the known inverter device. In this respect it is assumed that a thyristor is conductive during one positive halfwave. After the current passes through zero, the diode connected parallel to the thyristor first takes up the kickback current and the triggered thyristor ceases to conduct. Due to the power output to the user the negative halfwave of the kickback current (denoted partly by a broken line in FIG. 1) has an amplitude which is lower than that of the positive halfwave.

The push-pull controlled thyristor may be triggered only when the so-called recovery time (tq) for the previously conductive thyristor has elapsed, Which recovery time is necessary for the decomposition of the charge carriers. As is disclosed in DE-OS 30 46 767, the trigger pulse can be generated by means of a delay circuit which is started by the zero crossing of the current. For recognition of the zero crossing of the current there is usually provided a comparator circuit whose input receives a value which is proportional to the instantaneous resonant circuit current and which is activated as soon as the resonant circuit current has dropped below a value $i_s$. This value $i_s$ must be large enough to prevent starting of the delay circuit by interference signals superposed on the measuring signal, so that premature generation of the trigger pulse in given circumstances is prevented. Between the extinguishing of the one thyristor and the triggering of the next one, therefore, there should elapse at least a period of time which corresponds to the sum of the recovery time and the period of time within which the kickback current reaches the value $i_s$ after the zero crossing. In the case of a particularly large load or a particularly high power output it may even occur that the kickback current does not reach the value $i_s$, so that the trigger pulse activating a thyristor during the next halfwave cannot be generated. This causes a collapse of the voltage or current for the load.

SUMMARY OF THE INVENTION

It is an object of the present invention to construct an inverter device of the kind forth so that the period of time within which the resonant circuit current changes over from one electronic switch to the other can be reduced so that the power that can be delivered is increased.

This object is achieved in accordance with the invention in that for the electronic switches use is made of GTO (Gate Turn .088) thyristors which are switched by a pulse generator device which generates a blocking pulse each time at the zero crossing of the resonant-circuit current and whereby a trigger pulse can be generated for the subsequently conductive GTO thyristor a predetermined delay time after activation of the blocking pulse.

The invention thus utilises GTO thyristors It is known that GTO thyristors can be used as normal thyristors when only trigger pulses are applied to their gate. In that case the GTO thyristor is blocked only after the zero crossing of the current. However, it is alternatively possible to block a GTO thyristor by means of a blocking pulse, having the opposite polarity with respect to the trigger pulse, before the current traversing the thyristor passes through zero. This possibility is utilised by the inverter described in EP-OS 137 401. In that case at least 20% of the current to be switched must flow across the gate of the thyristor as a blocking current, implying a correspondingly powerful and hence expensive pulse generator.

In a invertor according to an embodiment of the present invention the current traversing the electronic switching elements sinusoidally approaches a zero crossing. At the zero crossing of the resonant circuit current, the current-carrying GTO thyristor, however is blocked by a comparatively low-power blocking pulse. A low-power pulse generator suffices for this purpose. A GTO thyristor per se, does not conduct any longer after the zero crossing of the current flowing therethrough. The blocking pulse, however, accelerates the charge carrier decomposition in the GTO thyristor and hence substantially reduces the recovery time. The trigger pulse for the next GTO thyristor can then succeed the blocking pulse at a minimum distance in time, so that hardly a gap occurs between the two halfwaves.

The blocking pulse should not start exactly at the zero crossing of the resonant circuit current; it can also be generated briefly earlier or later (up to 2% of the period duration), i.e. near the zero crossing.

When the blocking pulses are supplied by a comparatively high-ohmic pulse generator even further before the zero crossing, they are practically short-circuited by the gate-cathode path of the GTO thyristor which is still very low-ohmic at that time. This situation changes only when the path becomes more high-ohmic. Even though the blocking pulse commences rather early in that case, it becomes active only near the zero crossing.

As appears from the foregoing, one possibility of defining the start of a blocking pulse consists in the determination of the conductivity of the gate cathode path. However, this operation is comparatively complex, because it necessitates the measurement of the conductivity of that path. In a simpler embodiment of the invention, therefore, there is provided a measuring device for the resonant-current circuit which is coupled to a comparator circuit which is activated when the resonant-circuit current drops below a reference value, the pulse generator device being controlled by the comparator circuit so that the blocking pulse is generated a predetermined delay time after the current has dropped below the reference value. Thus, it is not necessary to measure the conductivity of the gate-cathode path of the GTO thyristors, but only the resonant-circuit current which must in any case be measured for control purposes. Contrary to the variation of the kickback current, the variation in time of the active resonant-current halfwave is substantially independent of the load of the rectifier. Consequently, the position in time of the blocking pulse, and hence the position in time of the trigger pulse for the other GTO thyristor, both referring to the zero crossing of the resonant-circuit current, does not depend on the load. Contrary to inverters of the kind set forth, skipping of a trigger pulse is precluded.

IN THE DRAWING

The invention will be described in detail hereinafter with reference to the drawing. Therein:

FIG. 1 shows the variation in time of the resonant-circuit current in a series-resonance inverter whose electronic switches each comprise a respective thyristor, FIG. 2 shows an inverter in accordance with one embodiment of the invention for generating the filament current of an X-ray tube, FIG. 3 shows a window comparator suitable for use in the embodiment of FIG. 2, FIGS. 4a and 4b show the variation in time of different signals for maximum and for reduced output power, and;

FIG. 5 shows a circuit diagram of an inverter, used for generating the high voltage for an X-ray tube, in which the invention can also be used.

DESCRIPTION OF THE PREFERRED EMBODIMENT

Figure 1:
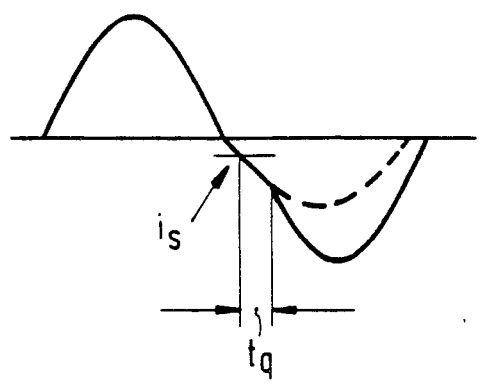
Figure 2:
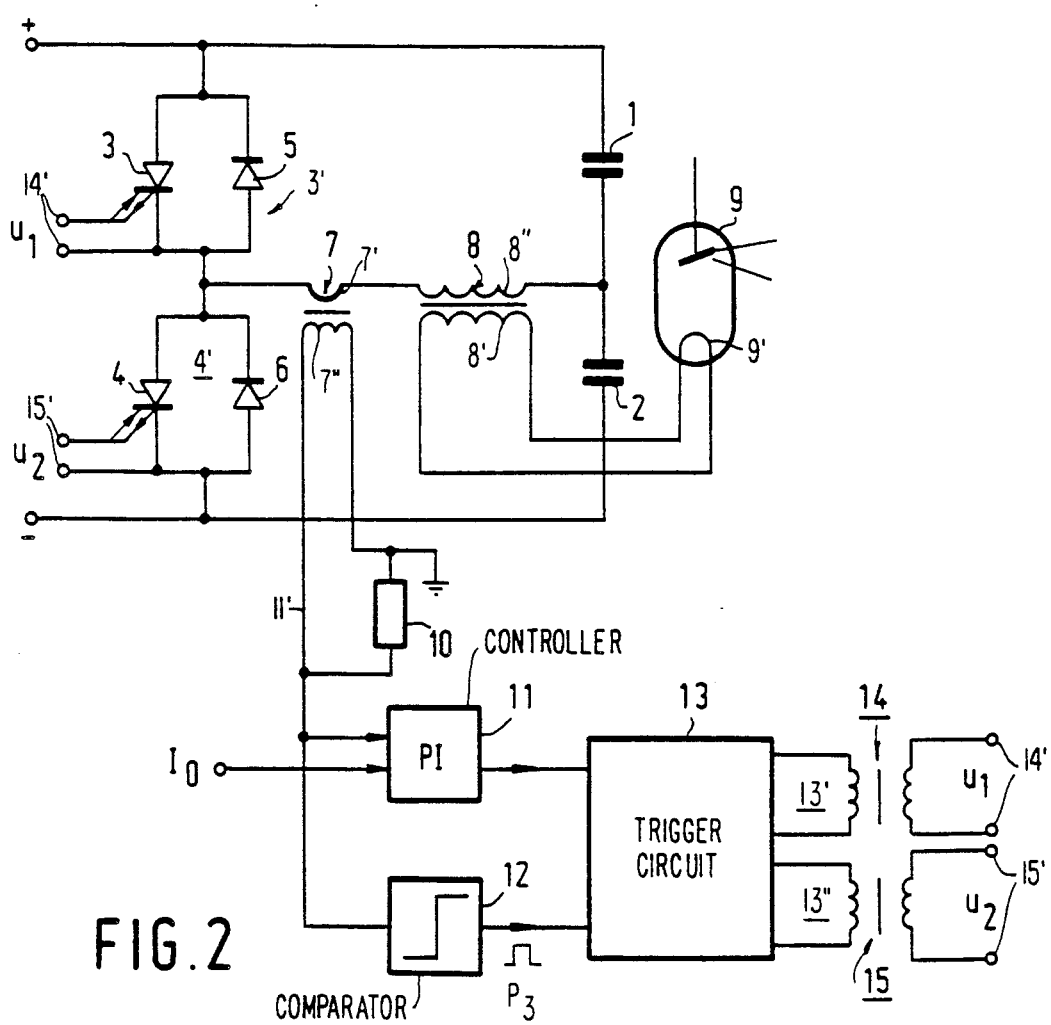

The input terminals + and − of the inverter shown in FIG. 2 receive a d.c. voltage which can be formed from an a.c. voltage by rectifying (not shown). Two capacitors 1 and 2 of equal value are connected in series to the input terminals receiving the d.c. voltage, the series connection is connected parallel to two electronic switches 3' and 4'. Switch 3 comprises a GTO thyristor 3 and a diode 5 connected anti-parallel thereto. Switch 4' comprises GTO thyrister 4 and a diode 6 connected anti-parallel. The junctions of the switches 3 and 4 on the one side and the junction b of the capacitors 1, 2 on the other side are connected to one another by way, of the series connection of the primary winding of a current transformer 7 for measuring the actual value of the resonant-circuit current and the primary winding 8" of a filament transformer 8. The filament 9' of an X-ray tube 9 is connected to the secondary winding 8' of said filament transformer 8.

The filament transformer 8 is constructed for isolating the potentials on its primary side (substantially ground potential) and its secondary side (negative high voltage potential) and, therefore, has a comparatively high leakage inductance which forms a series resonant circuit, having a series resonance frequency of, for example 15 kHz, in conjunction with one of the capacitors 1 and 2. During one halfwave, a resonant-circuit current flows via the capacitors 1 and 2, the primary winding 8" and the GTO thyristor 4, and during the other halfwave, a current flows via the GTO thyristor 3, the primary winding 8" and the capacitors 1 and 2.

A resistor 10 is connected to the secondary winding 7" of the current transformer 7. The voltage across this resistor is proportional to the instantaneous value of the current through the primary winding 8" (and 7'). This voltage is applied to a controller 11 having a PI characteristic and to a window comparator 12. The controller 11 compares a reference value $I_o$ of the filament current with the effective value of the measured current present in line 11' (for generating this effective value from the instantaneous value across the resistor 10, there must be provided an RMS component for generating the effective value (not shown)) and supplies an output signal on pulput 11" which depends on the difference between these values. The window comparator 12 is activated as soon as the instantaneous value of the current on line 11" has dropped below a value $i_s$. This value should be small in comparison with the amplitude of the resonant-circuit current, but still so large that activation takes place substantially unaffected by interference signals; for an amplitude of 8 A, for example $i_s = 0.5$ A is a suitable value. The construction of window comparator 12 is shown in FIG. 3.

The comparator 12 comprises two amplifiers 121 and 122 which have a high-ohmic output and which receive the voltage across the resistor 10 via line 11' at their respective inverting and non-inverting inputs. The non-inverting inputs of the amplifiers 121 and 122 are connected to the tapping of a voltage divider 123 connected comprising series resistances 123' and 123" connected; between ground and the positive supply voltage V+, and to the signal input line 11 of the comparator, respectively. The inverting inputs of the amplifiers 121 and 122 are connected to the signal input line 11' and to the tapping, respectively, of a further voltage divider 124 comprising series resistances 124' and 124" connected between ground and a negative supply voltage V−. The outputs of the two amplifiers 121, 122 are connected to one another via line 126 and, via a resistor 125, to the positive supply voltage V+. These outputs at line 126 also constitute the output of the window comparator 12 supplied to trigger circuit 13 (FIG. 2).

For as long as the resonant-circuit current is positive, and hence the voltage across the resistor 10 is higher than the positive d.c. voltage on the tapping of the divider 123, the amplifier 121 supplies a current (the amplifier 122 is blocked) so that a low potential occurs on the common output line 126. When the voltage on the common input line 11' drops below the voltage on the tapping of the divider 123 (in which case the resonant circuit current has dropped below the value $i_s$), the amplifier 121 no longer supplies a current either. It is only after the common input at line 11' has dropped below a negative value, corresponding to the voltage on the tapping of the divider 124, that the amplifier 122 supplies a current on output line 126. The window comparator thus supplies a positive pulse for each zero crossing of the resonant circuit current (in both directions), the leading edge of the positive pulse being used to generate a blocking pulse.

The controller 11 and the window comparator 12 control a trigger circuit 13 which may comprise, (like the trigger circuits for thyristors) inter alia flipflops, logic combinational circuits and a voltage-controlled oscillator which is controlled by the controller 11 and which determines the frequency of the trigger pulses. The blocking pulses commence a defined delay time after the leading edge of the positive pulses supplied by the window comparator 12. The trigger circuit comprises two outputs 13' and 13" which are coupled, via pulse transformers 14 and 15, respectively, to the gate-cathode paths of the GTO thyristors 3 and 4, respectively.

The operation of the trigger circuit is shown in FIGS. 4a and 4b which represent the variation in time of the resonant-circuit current (first line) and the output voltages $U_1$ and $U_2$ of the pulse transformers 14 and 15, respectively (second and third line) for a maximum output power (FIG. 4a) and for a lower output power (FIG. 4b).

The first (positive) halfwave of the resonant-circuit current is initiated by a trigger pulse P1 (FIG. 4a) for the associated GTO thyristor (for example, thyristor 3) (voltage $u_1$), after the other GTO thyristor 4 has been blocked by pulse $P_2$. The duration of the trigger pulse $P_1$ should be at least so long that the resonant-circuit current exceeds the value of the pull-in current before termination of the trigger pulse. After the halfwave has passed its maximum (for example, 8A) and the resonant-circuit current has ultimately dropped below, for example a value $i_2$, the window comparator 12 supplies a positive pulse $P_3$, FIG. 3, which causes the trigger circuit 13 to generate a blocking pulse $P_1$ (FIG. 4a) which has the opposed polarity with respect to the preceding trigger pulse and whose leading edge has been shifted a predetermined delay time $t_d$ with respect to the leading edge of the pulse $P_3$ supplied by the window comparator 12. As shown in FIG. 3, Pulse $P_3$ is symetrical with respect to the zero crossing. For a duration of the halfwave of, for example 33 μs, $t_d = 0.6$ μs is an attractive value for the given value $i_s$ which results from the delay times of the trigger circuit 13 and the pulse transformers 14, 15, i.e. without an additional delay device. In the optimum case, the blocking pulse $P_1$ is situated in time so that the halfwave is not prematurely terminated thereby and that the charge carriers from the blocked GTO thyristor are eliminated as soon as possible after the zero crossing of the resonant-circuit current.

After the blocking of the thyristor 3, the GTO thyristor 4 is triggered (by means of voltage $u_2$). Between the leading edges of the blocking pulse $P_1$ for the GTO thyristor 3 and of the trigger pulse $P_2$ for the GTO thyristor 4 a period of time should elapse which corresponds at least to the largest feasible recovery time $t_q$. By suitable matching of the threshold values $i_s$, $t_d$ and $t_q$ subsequent negative halfwave produces a substantially sinusoidal current variation in conjunction with the preceding positive halfwave. When the negative halfwave has reached the value $-i_s$ after the triggering of the GTO thyristor 4, a blocking pulse $P_2$ is produced for the GTO thyristor 4, after which a trigger pulse $P_1$ is Produced for the GTO thyristor 3 again after the delay time. The blocking pulses may be so wide that they overlap the trigger pulses, for as long as it is ensured that the required delay ($t_q$) exists between the blocking pulse for one GTO thyristor and the trigger pulse for the other GTO thyristor.

FIG. 4b shows the same signals for a lower output power of the inverter. It is assumed that the first current halfwave has been triggered still in the zero crossing. When the maximum value has been exceeded and the value $i_s$ reached again, a blocking pulse $P_1$ is generated for the thyristor 3. The trigger pulse $P_2$ for the GTO thyristor 4, however, does not follow immediately after the recovery time has elapsed, but substantially later. Between the zero crossing of the positive halfwave and the trigger pulse $P_2$ for the thyristor 4, therefore, first a negative kickback current occurs which flows via the diode 5. This phase terminates only after the trigger pulse $P_2$ for the thyristor 4, and is followed by a part of the negative halfwave.

Comparison of the FIGS. 4a and 4b reveals that the blocking pulses are generated, independently of the output power and with a delay, whenever the absolute value of the current drops below the value $i_s$. Immediately after expiration of the recovery time $t_q$, a trigger pulse can be generated for the respective other GTO thyristor (as in FIG. 4a), but this pulse can alternatively be generated later as in FIG. 4b to reduce the power output in accordance with a given implementation.

FIG. 5 shows a series-resonance inverter 20 for generating the high voltage for an X-ray tube 9 and which may also have a construction in accordance with the invention. The inverter 20 comprises two switching branches H and B which are connected in parallel to the supply voltage terminals + and −. Branches A and B comprise the series connection of two electronic switches 21, 22 and 23, 24, respectively. Each of these electronic switches comprise a GTO thyristor and a diode connected anti-parallel thereto as shown in FIG. 2. Between the junctions of the switches 21 and 22 on the one side and the switches 23 and 24 on the other side there is connected the series connection of a capacitor 25 and the primary winding 26 of a high voltage transformer 27. The latter has a comparatively high leakage inductance which forms a series resonant circuit in conjunction with the capacitor 25. The high voltage transformer 27 comprises two secondary windings 28 and 29 which feed a rectifier 30, 31, respectively, for generating a positive and a negative high voltage, respectively, which are smoothed by capacitors 32 and 33 and applied to the anode and the cathode, respectively, of the X-ray tube 9.

Ignoring the necessary potential offset, the switches 21 and 24 (or 22 and 23) form a bridge diagonal and receive the same pulse voltage. During one halfwave the resonant-circuit current flows through the capitor 25 and winding 26 i.e. via the switches 21 and 24, and during the other halfwave it flows via the switches 22 and 23, capacitor 25 and winding 26. In this case, the series-resonance inverter again delivers its maximum power when the GTO thyristors in the electronic switches are blocked briefly before the zero crossing is reached and the GTO thyristors present in the respective other current path are triggered after the reduced recovery time has elapsed.

What is claimed is:
1. An inverter device comprising:
   terminal means for receiving an applied DC voltage;
   a pair of push-pull coupled electronic switches each including a GTO thyristor;
   a series resonant circuit coupled to each said switches and to said terminal means for receiving said voltage, said circuit exhibiting successive halfwave resonant circuit currents having a zero crossing therebetween and which traverse said switches; and
   pulse generator means responsive to the occurrence of said zero crossing of said currents for generating a blocking pulse for turning off one of the thyristors of said switches and for generating a trigger pulse for subsequently turning on the other of said thyristors after a first time delay after activation of said blocking pulse.

2. The inverter device of claim 1 wherein the pulse generator means comprises means for producing a signal whose value manifests the value of the resonant circuit current, comparator means for comparing the value of said signal to a reference value and means for producing said blocking pulse after a second time delay after the resonant current magnitude decreases in value with respect to the reference value.

3. An inverter device as claimed in claim 2 wherein the comparator means comprises a window comparator whose output signal assumes a first state within a range which is symmetrical with respect to the zero crossing point of the resonant circuit current and assumes a second state outside said range, on both sides of said zero crossing point.

4. The inverter of claim 1 wherein said series resonant circuit includes a transformer having primary and secondary windings, said resonant circuit including an inductance formed by the primary winding, said device further including a filament circuit of an X-ray tube, said secondary winding being coupled to said filament circuit.

5. The inverter device of claim 2 wherein said series resonant circuit includes a transformer having primary and secondary windings, said resonant circuit including an inductance formed by the primary winding, said device further including a filament circuit of an X-ray tube, said secondary winding being coupled to said filament circuit.

6. The inverter device of claim 3 wherein said series resonant circuit includes a transformer having primary and secondary windings, said resonant circuit including an inductance formed by the primary winding, said device further including a filament circuit of an X-ray tube, said secondary winding being coupled to said filament circuit.

7. The inverter device of claim 1 wherein said series resonant circuit includes a transformer having a primary and a plurality of secondary windings, said resonant circuit including an inductance formed by the primary winding, said device further including voltage rectifier means coupled to said secondary windings for generating a voltage for operating an X-ray tube.

8. The inverter device of claim 2 wherein said series resonant circuit includes a transformer having a primary and a plurality of secondary windings, said resonant circuit including an inductance formed by the primary winding, said device further including voltage rectifier means coupled to said secondary windings for generating a voltage for operating an X-ray tube.

9. The inverter device of claim 3 wherein said series resonant circuit includes a transformer having a primary and a plurality of secondary windings, said resonant circuit including an inductance formed by the primary winding, said device further including voltage rectifier means coupled to said secondary windings for generating a voltage for operating an X-ray tube.

10. An inverter comprising:
   means for receiving an applied DC voltage;
   a pair of push-pull coupled electronic switch means each including an electronic switch having on and off states in response to an applied corresponding pulse;
   a series resonant circuit coupled to each said switch means and to said means for receiving said voltage, said circuit exhibiting a resonant circuit alternating current having a zero crossing and which current traverses said switches; and
   pulse generator means responsive to a current value representing the occurrence of said zero crossing for generating a first pulse for turning off one of the said switches and for generating a trigger pulse for subsequently turning on the other of said switches after a first time delay after activation of said first pulse.

11. The inverter of claim 10 wherein the pulse generator means comprises means for producing a signal whose value manifests the value of the resonant circuit current, comparator means for comparing the value of said signal to a reference signal value and means for producing said first pulse after a second time delay after the resonant current decreases in magnitude relative to said reference value.

12. The inverter of claim 11 wherein said comparator means comprises a window comparator means for supplying a positive pulse representing each zero crossing of said resonant current, control means responsive to said positive pulse and to the value of said alternating current for generating a signal determining the frequency of occurrence of said trigger pulse and trigger pulse generating means responsive to said latter signal for generating said trigger pulse at said determined frequency.

* * * * *